(12) United States Patent
Mattioni

(10) Patent No.: US 7,178,320 B2
(45) Date of Patent: Feb. 20, 2007

(54) HORSE COVER

(76) Inventor: Eugenia M. Mattioni, 230 Davis Ave., Audobon, NJ (US) 08106

( * ) Notice: Subject to any disclaimer, the term of this patent is extended or adjusted under 35 U.S.C. 154(b) by 88 days.

(21) Appl. No.: 10/918,625

(22) Filed: Aug. 12, 2004

(65) Prior Publication Data

US 2006/0032195 A1  Feb. 16, 2006

(51) Int. Cl.
B68C 1/12 (2006.01)
B68C 5/00 (2006.01)

(52) U.S. Cl. .................................... 54/66; 54/79.1

(58) Field of Classification Search .......... 54/44.1, 54/44.2, 66, 79.1, 79.2, 79.3, 79.4
See application file for complete search history.

(56) References Cited

U.S. PATENT DOCUMENTS

| 876,435 | A | * | 1/1908 | Caldwell | 54/79.2 |
| 5,271,211 | A | * | 12/1993 | Newman | 54/79.2 |
| 6,574,948 | B2 | * | 6/2003 | Longtin | 54/79.2 |

* cited by examiner

Primary Examiner—Robert P. Swiatek
(74) Attorney, Agent, or Firm—Dante C. Rohr, Esq.

(57) ABSTRACT

The present invention is a two part horse cover comprising a saddle pad and detachable quarter sheet providing protection of the large muscles of the horses hind quarters while riding in cold or foul weather, and straps for holding the quarter sheet to the saddle pad in a rolled up position and a tail strap for keeping the quarter sheet in place.

4 Claims, 5 Drawing Sheets

HORSE COVER

FIELD OF THE INVENTION

This invention is related to a two piece horse cover and saddle pad providing hind quarter protection for a horse during foul or cold weather riding.

BACKGROUND OF THE INVENTION

It is known that cold, wet weather can be dangerous to an over-heated horse following hard work or a demanding performance. Covering the large muscles of the hind quarters with a cover prevents chilling and allows the heavy muscles to cool out slowly, helping to prevent muscle cramps and spasms.

Current, commercially available horse covers are not intended for use as a hind quarter cover while riding. These horse covers are designed for a horse which is inactive and not for short or long distance riding. These covers are designed primarily to provide warmth and protection from cold weather or as a saddle blanket and are not intended to protect the horse's hind quarters.

Available horse covers which are intended to provide hind quarters protection during cold weather riding do not provide adequate protection or flexibility. One currently available horse blanket attaches by D-rings to the back of the saddle. Because few saddles are fitted with D-rings this requires costly retrofitting of the saddle. This design is also prone to lifting and shifting, especially when the horse is ridden at faster gaits. An alternative to this design attaches the blanket to the saddle girth. As with the previous blanket, it is prone to movement and is limited to the size of horse on which it can be used. Both of these designs leave a gap between the saddle and blanket which exposes the horse to the elements, and the shifting and lifting of the blanket while the animal is moving tends to irritate the horse.

A third form of commercially available hindquarters covers is a long contoured piece of material which lays across the back of the animal over which the saddle is placed. This design is prone to bunching under the saddle and poor overall fit. The shifting and bunching of these various horse covers can lead to stress points and injury to the animal.

U.S. Pat. No. 688,203 discloses a harness shield attachment which is designed to be adjusted over the haunch of an animal and underneath the tail to hold a guard in place by buttons or other fastening devices on the harness and a securing attachment for the tail. The device is designed primarily to protect the harness from becoming fouled. The shield attachment would not provide weather protection for the horse nor could it be conveniently rolled up or folded away.

U.S. Pat. No. 5,177,940 discloses a horse cover a roll up quarter sheet of a single large sheet. '940 is designed to provide hind quarter protection during long distance riding in foul weather, and comprises a pair of Velco straps for holding the quarter sheet to the saddle in a rolled up position and a tail strap for keeping the sheet in place. The '940 is a single piece which is prone to bunching under the saddle which can lead to injury of the animal.

The present invention represents an improvement in previous horse covers in that it offers greater flexibility, convenience, comfort and protection. The two piece design overcomes the disadvantages inherent in prior horse covers.

SUMMARY OF THE INVENTION

The present invention is a two piece horse cover and saddle pad providing hind quarter protection during foul or cold weather riding. The horse cover rolls up and fastens behind the saddle. A tail strap keeps the horse cover in place. The invention allows the horse cover to be easily be unfolded or refolded, attached and detached while mounted or off the horse.

Accordingly, it is an object of the invention to provide a convenient, inexpensive, and effective hind quarter cover for a horse.

Yet another object of the invention is to provide a combination saddle blanket and hind quarters cover which permits the hind quarters cover to be easily and conveniently attached or detached from the saddle pad when not in use.

Another object of the invention is to provide a combination saddle blanket and hind quarters cover which permits the hind quarters cover to be rolled and conveniently secured behind the saddle.

Another object of the invention is to provide a horse cover that is securely positioned on the back of the horse eliminated lifting, shifting or bunching of the blanket while riding.

Yet another object of the invention is to provide a hind quarter cover which is waterproofable, washable, breathable, provides protection from the cold, and is comfortable and non-irritating. The invention may make use of many commercially available materials including Sunbrella, fleece, thinsulate, gortex or wool, or some combination materials thus providing foul weather protection from both water and cold.

These and other objects of the invention will become apparent to those skilled in the art to which the invention pertains when taken in light of the annexed drawings.

DETAILED DESCRIPTION OF THE INVENTION

Figure 1:
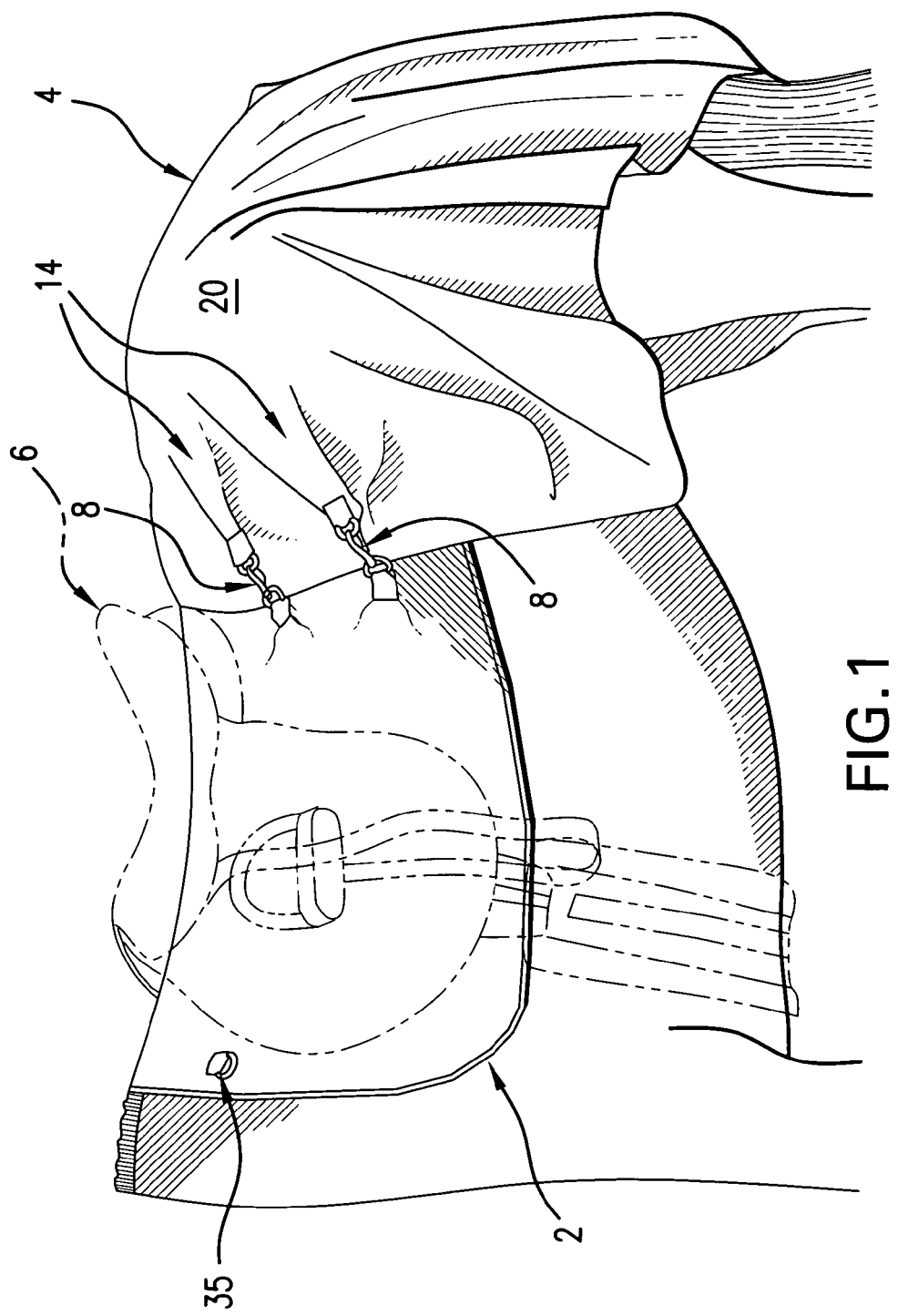
FIG. 1 is a side view of the invention as it is fitted on a horse.

Referring first to FIG. 1 which shows a side view of the invention illustrating the relationship and relative position of the saddle pad 2 and quarter sheet 4 of the invention as it is assembled. The saddle pad 2 rests on the back of the horse under the saddle 6 and has a forward end, a rearward end, a right and left side, a bottom and top side, a plurality of fasteners 8, shown as D-rings, are located along the rearward end of the topside of said saddle pad, and a plurality of straps of equal number on the right and left sides of the saddle pad. Behind the saddle pad 2 and covering the hindquarters of the animal is the quarter sheet 4. The quarter sheet 4 covers the hindquarters of the horse and has a forward end, a rearward end, a right and left side, a bottom and top side, a plurality of straps 14 which detachably connect to the fasteners 8 of said saddle pad 2 located along the forward end 14 of the topside 20 of said blanket. Utility rings 35 may be located along the forward end of the saddle pad 2.

Figure 2:
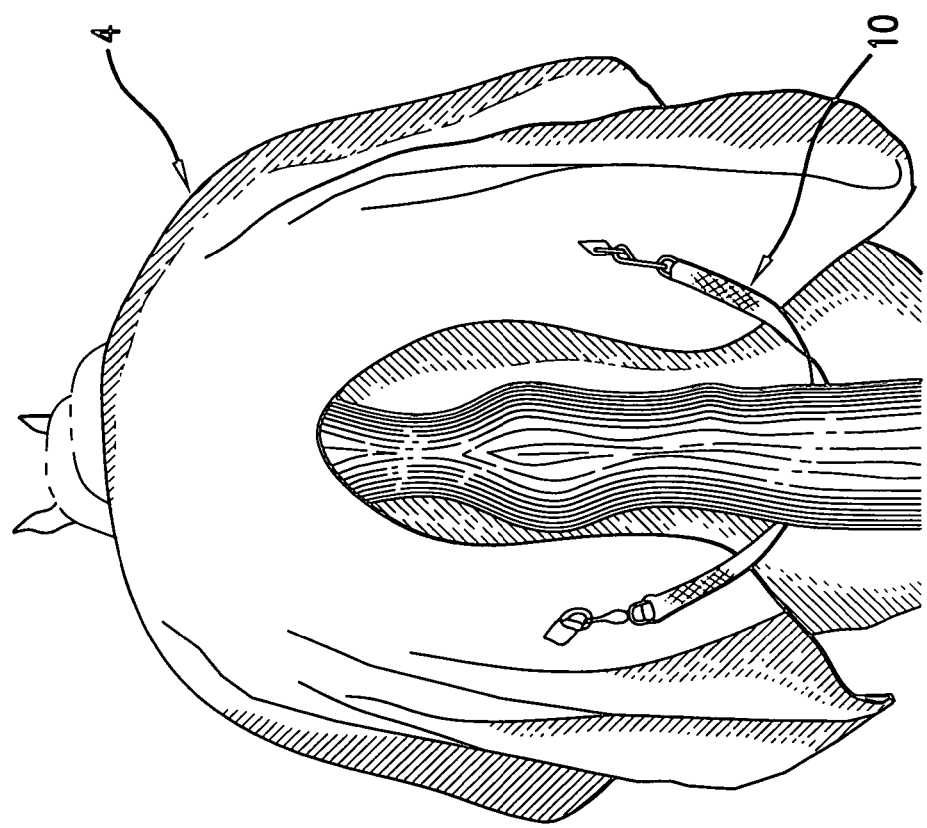
FIG. 2 is a rear view of the invention as it is fitted on a horse.

A tail strap 10, as shown in FIG. 2, fastened to the bottom of quarter sheet 4 near the tail end, keeps the quarter sheet 4 in place.

Although the fasteners 8 are shown in FIG. 1 as D-rings and hooks herein, it will be readily appreciated by those skilled in the art that virtually any type of connection device may be used to make a secure connection between the saddle pad 2 and the quarter sheet 4.

Figure 3:
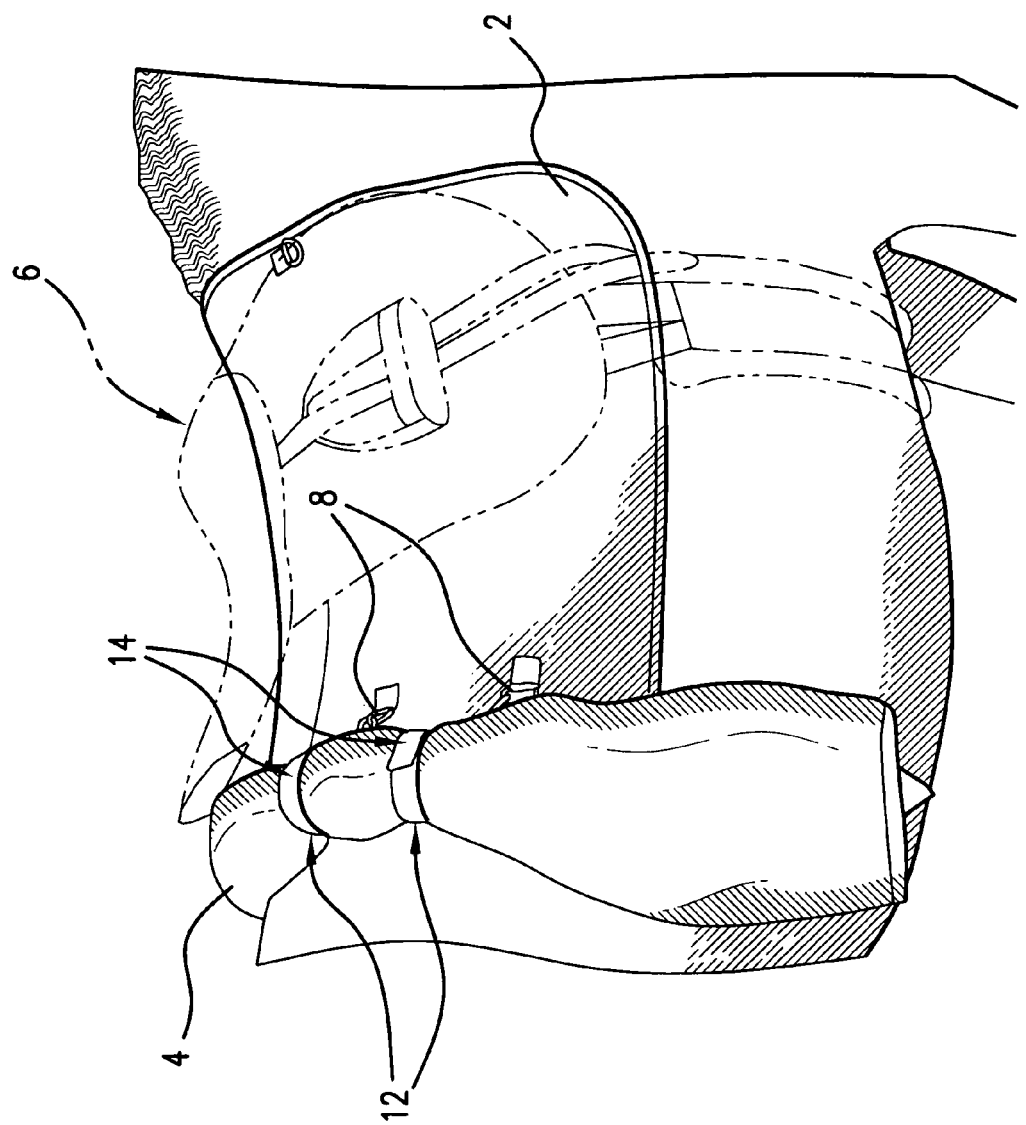
FIG. 3 is a side view of the invention with the horse cover in a rolled-up condition.

As shown in FIG. 3, footman loops 12 or a crupper ring (not shown) may be used for fastening the quarter sheet 4, in a rolled condition. Secured to the bottom 18 of the quarter sheet 4 are a plurality of straps 14 which are used to secure the quarter sheet 4 when it is in a rolled position. As shown in FIG. 3, straps are fastened in a position on fabric to fit between the saddle pad and saddle. The quarter sheet 4 rolls up and fastens with straps 14 and will be stored behind the saddle 6, whether English or Western, when not needed and will unfold easily when needed.

Figure 4:
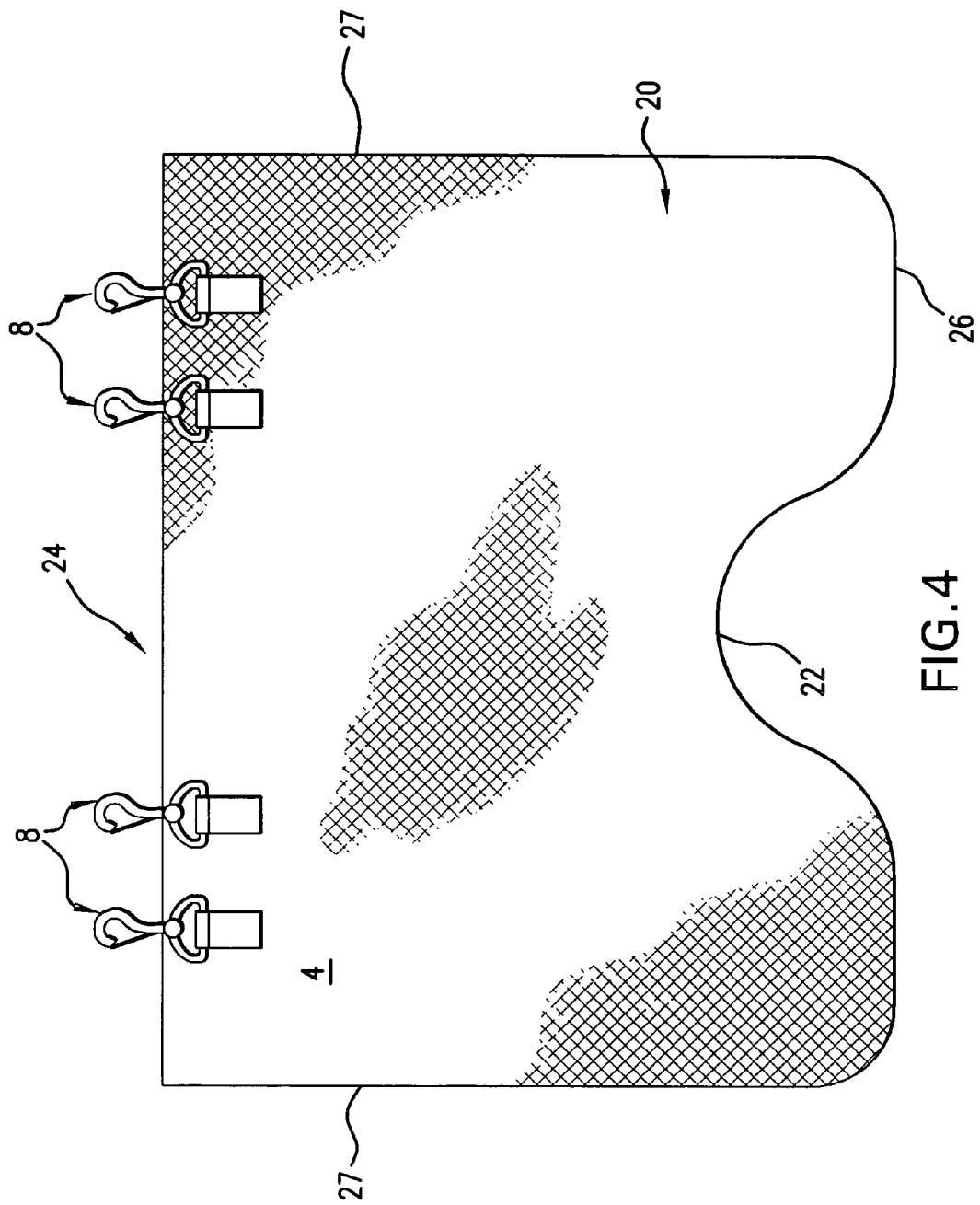
FIG. 4 is a top view of the quarter sheet of the invention.

FIG. 4 shows a top view of the quarter sheet 4 of the invention. The quarter sheet 4, comprises a blanket having a forward end 24, a rearward end 26, two side ends 27, a bottom 28 and topside 20. Said blanket having along the midpoint of its rearward edge a semi-circular cut-out 22. The quarter sheet 4 is bound on the edge with bias binding for better wearing and strength. Quarter sheet 4 is held securely by fasteners 8 connected to the saddle pad 2. In a preferred embodiment the quarter sheet was cut in an rectangular shape approximately 46-inches by 60-inches.

Figure 5:
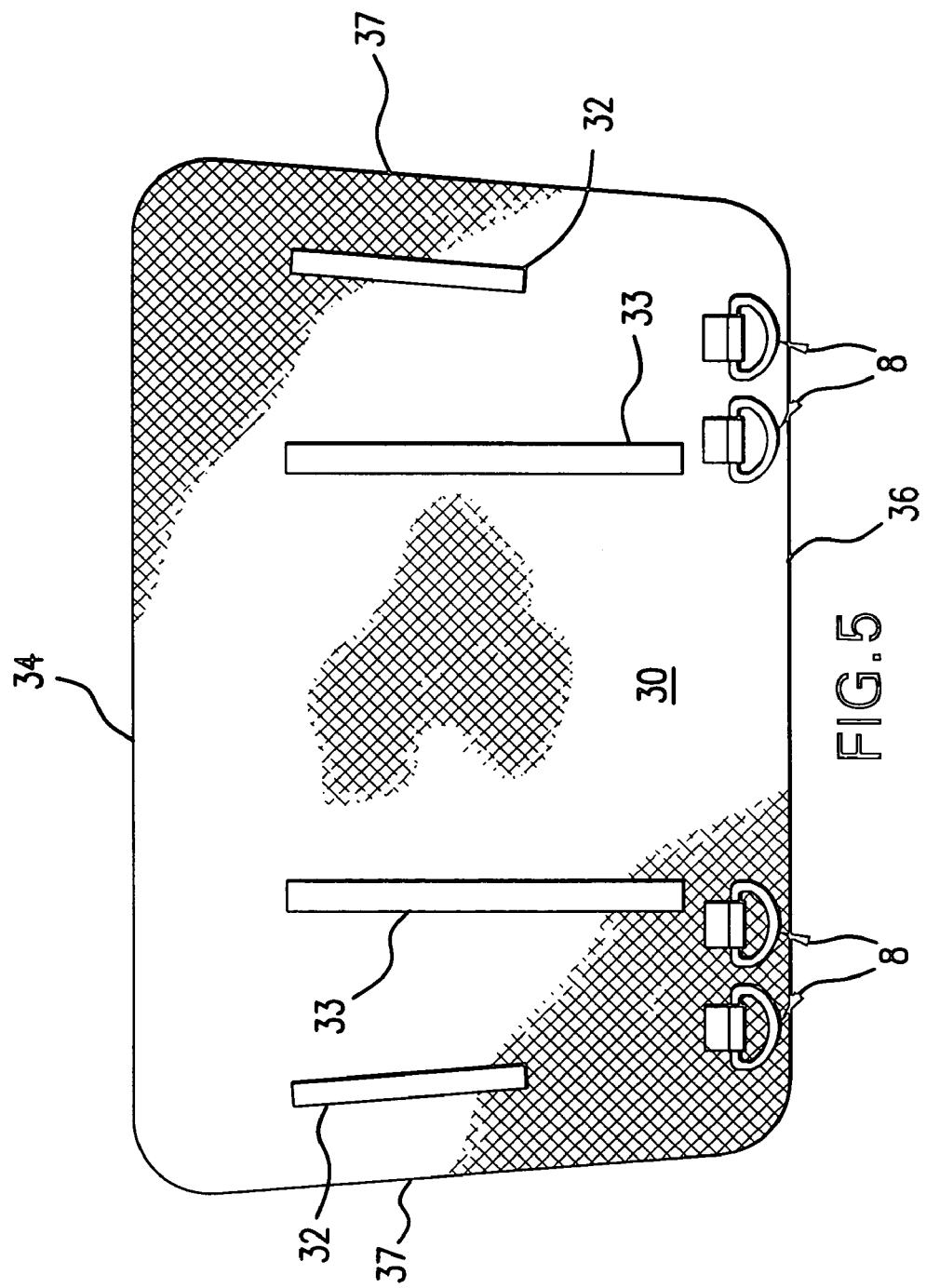
FIG. 5 is top view of the saddle pad of the invention.

FIG. 5 shows the saddle pad 2 of the invention. The saddle pad 2, comprises a blanket having a forward end 34, a rearward end 36, two side ends 37, a bottom 38 and topside 30, a plurality of fasteners 8 located along the rearward end 36 of the topside 30 of said saddle pad 2. The saddle pad 2 has matching girth straps 32 and billet straps 33 which run parallel to the side ends 37 of the saddle pad 2. In a preferred embodiment the saddle pad was cut in an approximately rectangular shape with forward end 34 approximately 40", the rearward end 26 approximately 35" and the side ends 37 approximately 25".

Designed for all equine disciplines, and cold and foul weather riding, this invention is a useful addition to any rider's equipment.

Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it therefore will be understood by those skilled in the aft that the present invention extends beyond the specifically disclosed embodiments and/or uses of the invention and obvious modifications and equivalents thereof. Thus, it is intended that the scope of the present invention herein disclosed should not be limited by the particular disclosed embodiments described above, but should be determined only be a fair reading of the claims that follow.

I claim:

1. A horse cover to be worn by an equine animal comprising: a saddle pad having a forward end, a rearward end, a right and left side, a bottom and top side, a plurality of fasteners located along the rearward end of the topside of said saddle pad, and a plurality of straps of equal number on the right and left sides of the saddle pad; and a rectangularly shaped hind quarters blanket having a forward end, a rearward end, a bottom and topside, a plurality of straps which detachably connect to the fasteners of said saddle pad located along the forward end of the topside of said blanket, said blanket having along the midpoint of its rearward edge a semi-circular cut-out said blanket designed to drape loosely about an animal and said pad right and left sides dimensioned for non-encircling engagement with said animal.

2. The horse cover of claim 1 wherein the saddle pad and rectangularly shaped hindquarters blanket are made of an insulated fabric material.

3. The horse cover of claim 2 wherein the saddle pad and rectangularly shaped hindquarters blanket are made of a waterproofable material.

4. The horse cover of claim 1 wherein the fasteners located along the rearward end of the topside of the saddle-pad are D shaped rings.

* * * * *